US008436972B2

(12) United States Patent
Arai et al.

(10) Patent No.: US 8,436,972 B2
(45) Date of Patent: May 7, 2013

(54) IN-PLANE SWITCHING TYPE LIQUID CRYSTAL DISPLAY DEVICE

(75) Inventors: Norihiro Arai, Hino (JP); Kunpei Kobayashi, Tachikawa (JP); Toshiharu Nishino, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 236 days.

(21) Appl. No.: 12/716,864

(22) Filed: Mar. 3, 2010

(65) Prior Publication Data

US 2010/0157222 A1  Jun. 24, 2010

Related U.S. Application Data

(62) Division of application No. 11/861,991, filed on Sep. 26, 2007, now abandoned.

(30) Foreign Application Priority Data

Sep. 27, 2006 (JP) ................................ 2006-263223

(51) Int. Cl.
G02F 1/1343 (2006.01)

(52) U.S. Cl.
USPC .......................................................... 349/141

(58) Field of Classification Search .................. 349/141
See application file for complete search history.

(56) References Cited

U.S. PATENT DOCUMENTS

| | | | |
|---|---|---|---|
| 6,646,707 B2 | 11/2003 | Noh et al. | |
| 6,950,167 B2 * | 9/2005 | Matsumoto et al. | 349/141 |
| 7,362,400 B2 | 4/2008 | Itou et al. | |
| 2005/0264720 A1 * | 12/2005 | Itou et al. | 349/99 |

FOREIGN PATENT DOCUMENTS

| | | |
|---|---|---|
| CN | 1603915 A | 4/2005 |
| CN | 1704823 A | 12/2005 |
| JP | 2002-062544 A | 2/2002 |
| JP | 2002-182230 A | 6/2002 |
| JP | 2003-307741 A | 10/2003 |
| JP | 2004-109794 A | 4/2004 |

(Continued)

OTHER PUBLICATIONS

Korean Office Action dated Dec. 10, 2008 and English translation thereof issued in a counterpart Korean Application 10-2007-97312.

(Continued)

*Primary Examiner* — Mark Robinson
*Assistant Examiner* — Erin Chiem
(74) *Attorney, Agent, or Firm* — Holtz, Holtz, Goodman & Chick, P.C.

(57) ABSTRACT

A liquid crystal display device comprises a pair of substrates subjected to an aligning treatment in mutually parallel but opposite directions, a liquid crystal layer interposed between the pair of substrates, a first electrode bent into a "<" shape, and a second electrode formed via an insulating film with the first electrode. The first electrode comprises one linear section and another linear section that extend in directions that intersect the alignment treatment direction at different angles, a bent section that is provided at each end where the one linear section and the other linear section adjacent to each other and that extends in a direction that intersects the alignment treatment direction at an angle that is greater than each of the intersecting angles of the one linear section and the other linear section and the alignment treatment direction with respect to the alignment treatment directions.

21 Claims, 9 Drawing Sheets

FOREIGN PATENT DOCUMENTS

| | | |
|---|---|---|
| KR | 10-2002-28477 A | 4/2002 |
| KR | 10-2004-0107648 A | 12/2004 |
| KR | 10-2006-045268 A | 5/2006 |

OTHER PUBLICATIONS

Chinese Office Action dated Nov. 7, 2008 and English translation thereof issued in a counterpart Chinese Application 2007-101944922.

Korean Office Action dated May 11, 2009 (4 pages), and English translation thereof (3 pages), issued in counterpart Korean Application Serial No. 10-2009-0010153.

Korean Office Action dated Jun. 30, 2009 (4 pages), and English translation thereof (2 pages), issued in counterpart Korean Application Serial No. 10-2007-0097312.

* cited by examiner

# IN-PLANE SWITCHING TYPE LIQUID CRYSTAL DISPLAY DEVICE

CROSS-REFERENCE TO RELATED APPLICATIONS

The present application is a Divisional Application of U.S. application Ser. No. 11/861,991 filed Sep. 26, 2007 now abandoned, which is based on Japanese Patent Application No. 2006-263223 filed on Sep. 27, 2006, the disclosures of both of which are incorporated herein by reference.

BACKGROUND OF THE INVENTION

1. Field of the Invention

The present invention relates to a liquid crystal display device that controls the orientation of liquid crystal molecules using a transversal electric field.

2. Description of the Related Art

Known liquid crystal display devices include an In-plane Switching (IPS) type liquid crystal display device that controls the orientation of liquid crystal molecules using an electric field parallel to the substrates that constitute the liquid crystal display device.

This liquid crystal display device comprises a pair of substrates arranged opposite each other at a predetermined gap, having been subjected to an aligning treatment in mutually parallel but opposite directions on each of the mutually opposed inner surfaces and, in the gap therebetween, a liquid crystal layer interposed substantially in parallel with the substrate surfaces, with the long axes of the liquid crystal molecules aligned in the direction of the aligning treatment. A pixel electrode in which a plurality of bent electrodes long and narrow in shape is formed in parallel at a distance from one another in a predetermined area for forming a single pixel is provided on the inner surface of one of the substrates of the pair of substrates, and an opposing electrode for generating an electric field that changes the orientation of the long axes of the liquid crystal molecules between the plurality of electrodes of the pixel electrode to an orientation that is substantially parallel to the substrate surfaces when voltage is applied between the opposing electrode and the pixel electrode is provided on the other substrate, in isolation from the pixel electrode.

This In-plane Switching (IPS) type liquid crystal display device generates an electric field parallel to the substrates that corresponds to display data between the pixel electrode and the opposing electrode. When an electric field is applied parallel to the substrate, the In-plane Switching (IPS) type liquid crystal display device controls on an inner surface substantially parallel with the substrate surfaces the orientation of the long axes of the liquid crystal molecules of a plurality of pixels comprising an area corresponding to the pixel electrode and opposing electrode, and displays an image.

Now, in the In-plane Switching (IPS) type liquid crystal display device, as described in Unexamined Japanese Patent Application KOKAI Publication No. 2002-182230, the plurality of bent electrodes of the first electrode is formed into a shape bent into a "<" shape to decrease the viewing angle dependability of the display and achieve a display having a wide viewing angle. That is, the orientation of the electric field parallel to the substrates that is generated between the opposing electrode and one of the electrodes of the two sections on either side of the bent section of the "<" shape, and the orientation of the electric field parallel to the substrates that is generated between the other linear section and the second electrode are made to differ from each other. With such an arrangement, the pixel electrode is formed so that the liquid crystal molecules are arranged in two different directions within each pixel.

However, in the In-plane Switching (IPS) type liquid crystal display device in which the plurality of electrodes of the first electrode are formed into a shape that is bent into a "<" shape, the problem arises that, when a strong electric field parallel to the substrates is generated, the orientation of the liquid crystal molecules within each pixel becomes non-uniform and, as a result of these pixels, display unevenness occurs.

SUMMARY OF THE INVENTION

The liquid crystal display device of the present invention comprises: a pair of substrates arranged opposite each other at a predetermined gap, having been subjected to an aligning treatment in mutually parallel directions on each of the mutually opposed inner surfaces; a liquid crystal layer interposed in the gap between the pair of substrates with long axes of liquid crystal molecules in alignment with the direction of the aligning treatment; a plurality of first electrodes provided on a first one of the mutually opposed inner surfaces of the pair of substrates for arranging a plurality of pixels in a matrix shape in a row direction and a column direction and thus forming a display region, a plurality of thin film transistors that are provided in the aligning-treated surface of the first substrate, each of the plurality of thin film transistors having a source electrode, a drain electrode and a semiconductor film, wherein the source electrode is connected to a corresponding one of the plurality of first electrodes; a plurality of signal lines that are arranged in the column direction, wherein the plurality of signal lines are connected to the drain electrodes of the plurality of thin film transistors; and a plurality of second electrodes that are arranged in isolation from the plurality of first electrodes so as to be closer to the first substrate than the plurality of first electrodes, wherein the plurality of second electrodes generate a transversal electric field between the plurality of first and second electrodes for changing the orientations of the long axes of the liquid crystal molecules within a plane that is substantially parallel with the surfaces of the substrates; wherein each of the plurality of second electrodes has a plurality of opposing sections that are formed so as to overlap with first electrodes among the plurality of first electrodes in a plan view in respective regions opposing to the first electrodes, and a common connection section that connects the plurality of opposing sections, wherein the plurality of second electrodes are provided corresponding to a plurality of rows of the plurality of pixels over an entire length of a row, wherein the plurality of first electrodes comprise a plurality of transparent conductive films respectively corresponding to the plurality of pixels, wherein a plurality of slits are provided in each transparent conductive film along the row direction, wherein each of the plurality of slits has: first and second linear sections, the first linear section extending in a first direction that crosses the directions of the aligning treatment at a first crossing angle, and the second linear section extending in a second direction that crosses the directions of the aligning treatment at a second crossing angle, wherein the first crossing angle is different from the second crossing angle; a first bent section that extends in a third direction that crosses the directions of the aligning treatment at a third crossing angle larger than the first crossing angle, wherein the first bent section is continuous to a first end of the first linear section; a second bent section that extends in a fourth direction that crosses the directions of the aligning treatment at a fourth crossing angle larger than the second crossing angle, wherein the second bent section is continuous to a first end of the second linear section, and the first end of the first linear section and the first end of the second linear section are adjacent to each other; and a connection section that connects the first and second bent sections, wherein for each of the plurality of thin film transistors, given a length A1 of the semiconductor film of the thin film transistor in the directions of the aligning treatment and a length A2 of the source electrode of the thin film transistor in the directions of the aligning treatment, A1 is larger than A2, wherein each of the opposing sections has first and second notches so as not to overlap with a region corresponding to a corresponding thin film transistor, and given a length B1 of the first notch corresponding to the semiconductor film in the directions of the aligning treatment and a length B2 of the second notch corresponding to the source electrode in the directions of the aligning treatment, B1 is larger than B2, and wherein for each of the plurality of first electrodes: (i) slits on a side closer to a corresponding signal line among the plurality of slits of the first electrode are provided with lengths shorter than lengths of the other slits so as not to overlap with the region corresponding to the corresponding thin film transistor, and (ii) a slit adjacent to a corresponding source electrode in the directions of the aligning treatment among the slits on the side closer to the corresponding signal line extends to a bump formed at a corresponding opposing section by the first and second notches, the slit being provided with a length longer than a length of a slit adjacent to a corresponding semiconductor film in the directions of the aligning treatment.

DETAILED DESCRIPTION OF THE PREFERRED EMBODIMENTS

Figure 1:
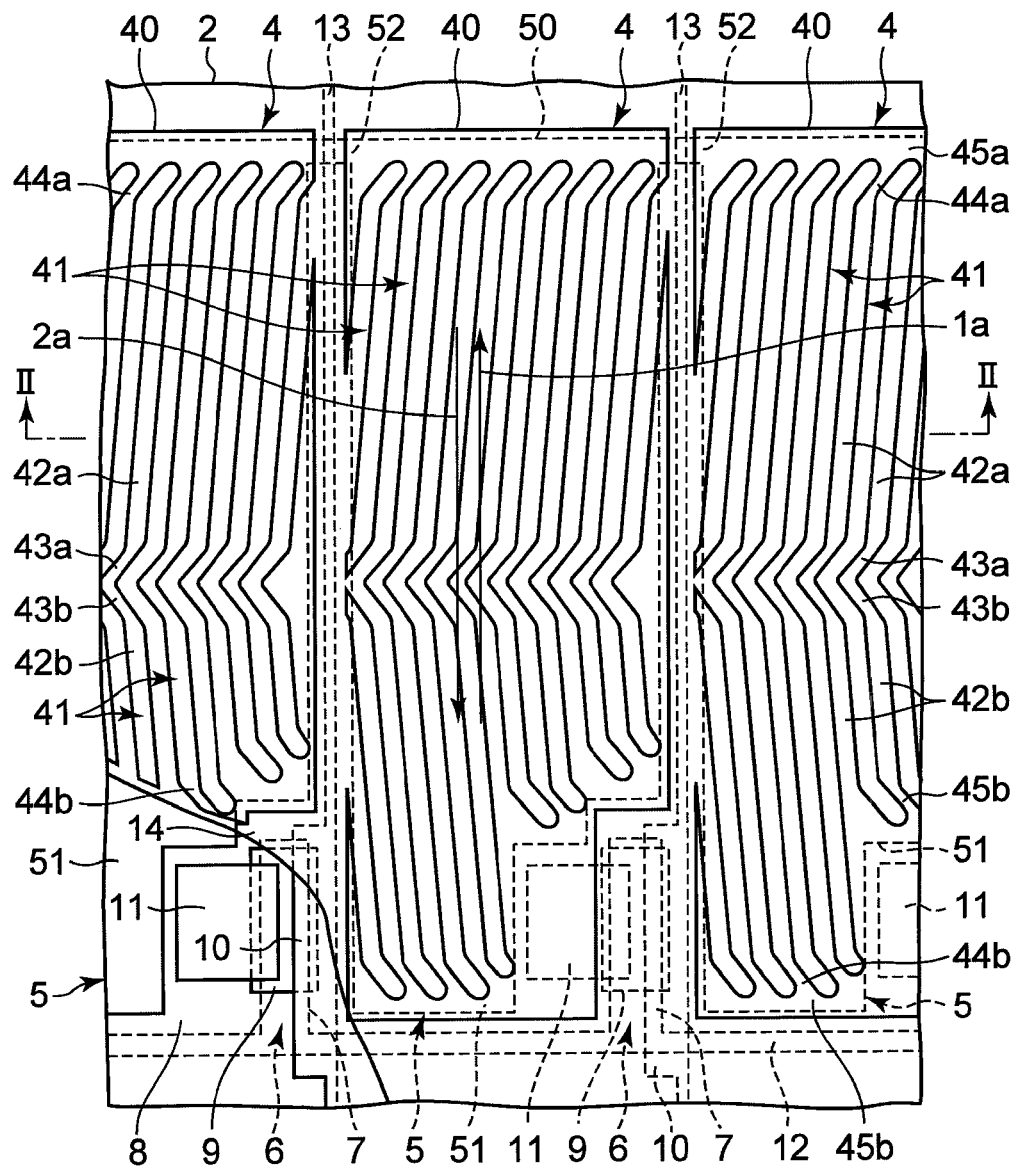
FIG. 1 is a plan view that shows a section of one substrate of a liquid crystal display device according to an example of the present invention.
Figure 2:
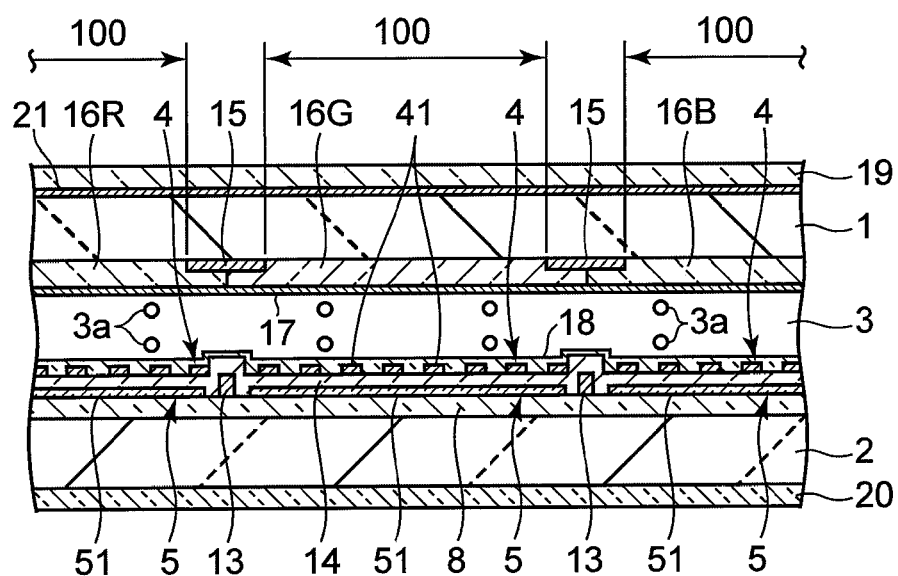
FIG. 2 is a cross-sectional view that shows a cross-section of the liquid crystal display device shown in FIG. 1 cut along line II-II.

FIG. 1 to FIG. 8 illustrate an example of the present invention. FIG. 1 is a plan view showing a section of one substrate of a liquid crystal display device, and FIG. 2 is a cross-sectional view showing a cross-section of the liquid crystal display device shown in FIG. 1 cut along line II-II.

This liquid crystal display device, as shown in FIG. 1 and FIG. 2, comprises a pair of transparent substrates 1 and 2 arranged opposite each other at a predetermined gap on an observed side (upper side in FIG. 2) and a side opposite that side, and a liquid crystal layer 3 interposed in the gap between the pair of substrates 1 and 2. First and second transparent electrodes 4 and 5 for generating an electric field that is substantially parallel to the surfaces of the substrates 1 and 2 when voltage is applied are formed in isolation from each other on one of the two mutually opposed inner surfaces of the pair of substrates 1 and 2, such as on the inner surface of the substrate 2 of the side opposite the observed side, for example. One of the plurality of first transparent electrodes 4 and the second transparent electrode 5 are arranged opposite each other, and a single pixel 100 that controls the orientation of the long axes of the liquid crystal molecules of the liquid crystal layer 3 is defined by the area where the electric field parallel to the substrates is generated between these electrodes. These pixels are arranged in plurality in a matrix shape. A pair of polarizing plates 19 and 20 of the observed side and the side opposite the observed side are disposed on the outer surface of the pair of substrates 1 and 2.

Hereinafter, the substrate 1 of the observed side is referred to as the "front substrate," the substrate 2 on the side opposite the observed side is referred to as the "back substrate," the polarizing plate 19 of the observed side arranged on the outer surface of the front substrate 1 is referred to as the "front side polarizing plate," and the polarizing plate 20 of the opposite side arranged on the outer surface of the back substrate 2 is referred to as the "back side polarizing plate."

The pair of substrates 1 and 2 are joined via a frame-shaped sealing material (not shown), and the liquid crystal layer 3 is interposed in the area of the gap between the pair of substrates 1 and 2 that is enclosed by the sealing material.

This liquid crystal display device is an active matrix display device. Of the first and second electrodes 44 provided in isolation from each other on the inner surface of the back substrate 2, a first electrode 4 is a plurality of pixel electrodes arranged in a matrix shape in a row direction (horizontally on the screen) and a column direction (vertically on the screen). A second electrode 5 is an opposing electrode arranged on a per row basis correspondingly to each pixel electrode 4 of that row.

Then, a plurality of active elements 6 arranged correspondingly to the plurality of pixels 100, a plurality of scan lines 12 arranged per pixel row comprising the plurality of pixels 100 arranged in the row direction, and a plurality of signal lines 13 arranged per pixel row comprising the plurality of pixels 100 arranged in the row direction are provided on the inner surface of the back substrate 2.

The active element 6 comprises an input electrode 10 and a output electrode 11 of a signal, and a control electrode 7 that controls the conduction between the input electrode 10 and the output electrode 11. The control electrode 7 is connected to the scan line 12 at each row, the input electrode 10 is connected to the signal line 13 at each column, and the output electrode 11 is connected to the pixel electrode 4.

The active element 6 is, for example, a TFT (thin film transistor), and comprises a control electrode (gate electrode) 7 formed on the surface of the back substrate 2, a transparent gate insulating film 8 formed on roughly the entire surface of the back substrate 2 covering the control electrode 7, an i-type semiconductor film 9 formed opposite the control electrode 7 on the gate insulating film 8, and a input electrode (drain electrode) 10 and output electrode (source electrode) 11 provided via an n-type semiconductor film (not shown) on both side sections of the i-type semiconductor film 9. hereinafter, the active elements 6 is referred to as "TFT".

Each of the plurality of scan lines 12 is formed on the surface of the back substrate 2 along one side (the bottom side in FIG. 1) of each pixel row in parallel with the pixel row, respectively connected to the gate electrode 7 of the TFT 6 of each row. Each of the plurality of signal lines 13 is formed along one side (the left side of FIG. 1) of each pixel column in parallel with the pixel column above the gate insulating film 8, respectively connected to the drain electrode 10 of the TFT 6 of each column.

The terminal alignment section (not shown) extending toward the outside of the front substrate 1 is formed on the border of the back substrate 2, and the plurality of scan lines 12 and the plurality of signal lines 13 are connected to a plurality of scan line terminals and signal line terminals provided on the terminal alignment section.

Then, the plurality of pixel electrodes 4 is formed above a transparent interlayer insulating film 14 formed on the front surface (not shown) of the back substrate 2, covering the plurality of TFT 6 and signal lines 13, and the opposing electrode 5 is formed above the gate insulating film 8. That is, the opposing electrode 5 is positioned farther toward the back substrate 2 side than the plurality of pixel electrodes 4, in isolation from the plurality of pixel electrodes 4 by the interlayer insulating film 14.

Each of the plurality of pixel electrodes 4 is formed in, for example, each region of a vertically long rectangular shape having a greater height along the vertical direction than the width along the horizontal direction of the screen, in a predetermined region for forming a single pixel 100, and comprises a first transparent conductive film (ITO film, for example) 40 that is formed in parallel with and at a distance from a plurality of bent electrodes 41 long and narrow in shape, having a length extending across roughly the entire length in the height direction of the region.

The plurality of bent electrodes 41 of the pixel electrode 4 is formed by providing a plurality of slits in the first conductive film 40. Then, these bent electrodes 41 are connected to common connection sections 45a and 45b formed on both end borders of the first conductive film 40, at the respective ends.

Then, one end side of the common connection section 45b of one end border (bottom end border of FIG. 1) of the first conductive film 40 overlaps the source electrode 11 of the TFT 6 via the interlayer insulating film 14. This first conductive film 40 is connected to the source electrode 11 in a connecting hole (not shown) provided on the interlayer insulating film 14.

The opposing electrode 5 is provided on a per pixel row basis across the total length thereof, and comprises a second transparent electrode film (for example, ITO film) 50 formed into a shape corresponding to the entire area of the plurality of pixels 100 of each row.

The second conductive film 50, as shown in FIG. 1, is patterned, forming a vertically long, rectangular opposing section 51 corresponding to the pixel shape in each area respectively corresponding to the plurality of pixels 100 of each row. Then, these opposing sections 51 are formed into a shape connected by the common connection section 52 of the side (the top end of the pixel 100 in the figure) opposite the side where the scan line 12 is established.

The second conductive film 50 may also be formed to a width corresponding to the height of the pixel 100, covering the entire length of the pixel row. With this arrangement, the second conductive film 50 is formed across the top of the plurality of signal lines 13, and the intersecting section of the second conductive film 50 and the signal line 13 is insulated by an insulating film (not shown) covering the signal line 13.

Then, the plurality of second conductive films 50 respectively corresponding to each pixel row is commonly connected (not shown) on the outside of the display region where the plurality of pixel electrodes 4 is arranged. Further, the common connection section of the second conductive film 50 is connected to an opposing electrode terminal provided on the terminal alignment section of the back substrate 2.

The opposing electrode 5 comprising the second conductive film 50 generates an electric field parallel to the substrates that changes the orientation of the long axis of the liquid crystal molecule 3a to an orientation substantially parallel with the surfaces of the substrates 1 and 2, between the plurality of bent electrodes 41 of the pixel electrode 4 when voltage is applied between the opposing electrode 5 and the pixel electrode 4.

On the other hand, a light shielding film 15 corresponding to the plurality of TFT 6 and the areas between the plurality of pixels 100 is formed on the inner surface of the front substrate 1. Color filters 16R, 16G, and 16B of the three colors red, blue, and green are provided correspondingly to the respective plurality of pixels 100, on the light shielding film 15.

Furthermore, horizontal alignment films 17 and 18 of a polyimide film, etc., that align the liquid crystal molecule 3a of the liquid crystal layer 3 so that its long axis is substantially parallel with the surfaces of the substrates 1 and 2, are formed on the inner surface of the front substrate 1, respectively covering the color filters 16R, 16G, and 16B provided on the front substrate 1 and the plurality of pixel electrodes 4 provided on the back substrate 2.

Then, the inner surfaces of the pair of substrates 1 and 2 are each subjected to an aligning treatment in mutually parallel but opposite directions by rubbing the film surfaces of the alignment films 17 and 18, respectively, in predetermined directions.

Figure 3:
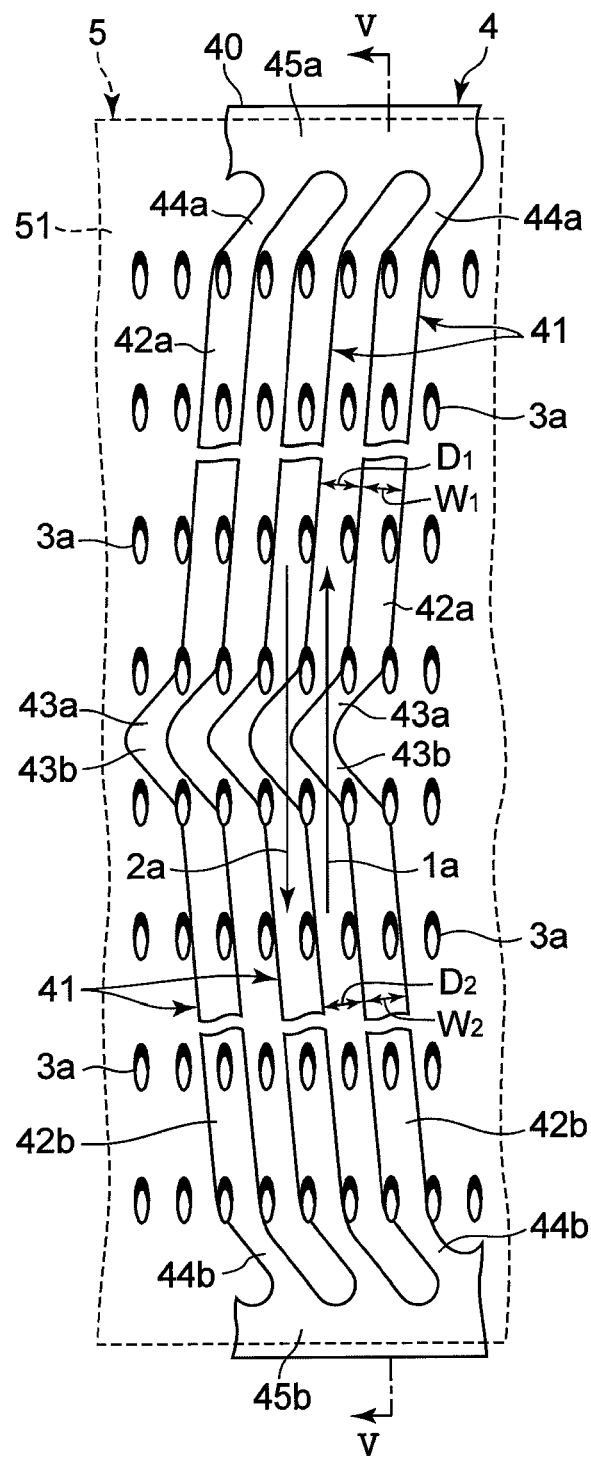
FIG. 3 is an enlarged plan view showing an enlarged section of the pixel electrode and opposing electrode of the liquid crystal display device shown in FIG. 1.
Figure 4:
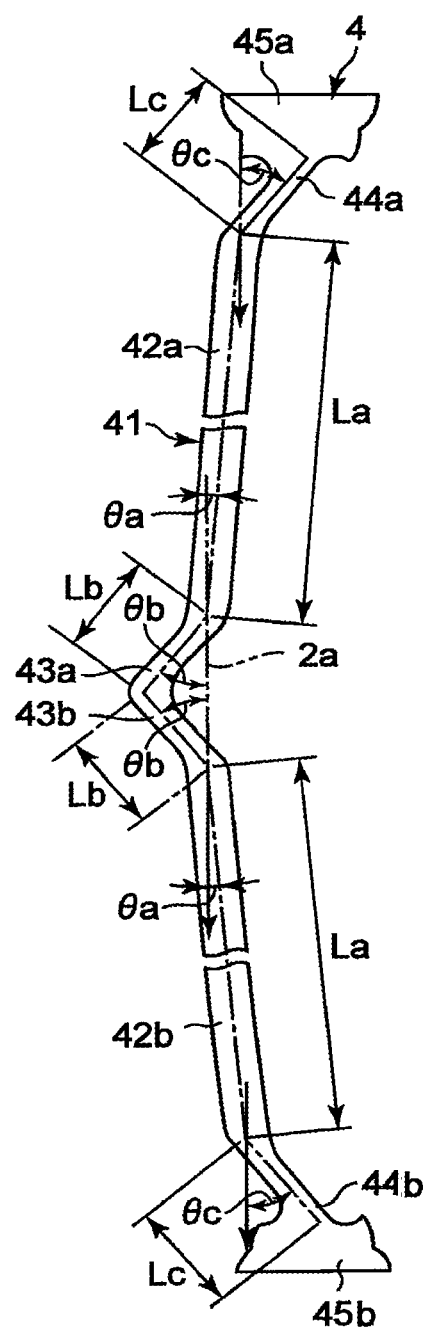
FIG. 4 is an enlarged plan view shown an enlarged one bent electrode of the pixel electrode of the liquid crystal display device shown in FIG. 1.

FIG. 3 is an enlarged plan view showing an enlarged section of the pixel electrode 4 and the opposing electrode 5, and FIG. 4 is an enlarged plan view showing an enlarged bent electrode 41 of the pixel electrode 4.

In FIG. 1, FIG. 3, and FIG. 4, 1a indicates the aligning treatment direction of the inner surface of the front substrate 1 (rubbing direction of the horizontal alignment film 17), and 2a indicates the aligning treatment direction of the inner surface of the back substrate 2 (rubbing direction of the horizontal alignment film 18), respectively. In this example, the vertical alignment film 17 of the inner surface of the front substrate 1 is aligned, via the aligning treatment, parallel to the vertical direction of the screen, from the bottom to the top of the screen, and the vertical alignment film 18 of the inner surface of the back substrate 2 is aligned, via the aligning treatment, parallel to the vertical direction of the screen, from the top to the bottom of the screen.

Then, each of the plurality of bent electrodes 41 of the pixel electrode 4 is formed so that two linear sections 42a and 42b intersect the aligning treatment directions 1a and 2a, respectively, at different angles, as shown in FIG. 3 and FIG. 4. Further, at the center of the unit region of the rectangular shape in the vertical direction, the plurality of bent electrodes 41 are formed so that they substantially bend into a "<" shape connected at the section where the two linear sections 42a and 42b intersect. Then, in the section where the two linear sections 42a and 42b connect, a bent section 43a wherein the side connected to one linear section 42a bends in a direction in which the incline angle with respect to the aligning treatment directions 1a and 2a increases with respect to the one linear section 42a, and a bent section 43b wherein the side connected to the other linear section bends in a direction in which the incline angle with respect to the aligning treatment directions 1a and 2a increases with respect to the other linear section 42b are provided. The connection section that connects the bent sections 43a and 43b, which connect the two linear sections 42a and 42b, is formed in a circular arc shape where one side border and the other side border smoothly connect.

That is, the bent electrode 41 is formed from the two linear sections 42a and 42b having first inclines that differ in incline orientation with respect to the aligning treatment directions 1a and 2a, and the bent sections 43a and 43b having second inclines with incline angles that are greater than the first incline and differ in incline orientation with respect to the aligning treatment directions 1a and 2a. Further, the bent electrode 41 is continually formed with the connection section where these bent sections 43a and 43b connect to each other.

The two linear sections 42a and 42b of the bent electrode 41 are formed at substantially the same width. The ratio of a distance $D_1$ between the neighboring one linear sections 42a and 42a of the bent electrode 41 to a width $W_1$ of the one linear section 42a is set to $D_1/W_1$, and the ratio of a distance $D_2$ between the neighboring one linear sections 42b and 42b of the bent electrode 41 to a width $W_2$ of the other linear section 42b is set to $D_2/W_2$, with each set to 1/3 to 3/1, preferably to 1/1.

Further, given an incline angle θa of the two linear sections 42a and 42b of the plurality of bent electrodes 41 of the pixel electrode 4 with respect to the aligning treatment directions 1a and 2a, and an incline angle θb of the two bent sections 43a and 43b connecting the two linear sections 42a and 42b with respect to the aligning treatment directions 1a and 2a, θa and θb are set to:

0°<θa<20°
20°<θb<40°

Furthermore, given a length La of the two linear sections 42a and 42b, and a length Lb of the two bent sections 43a and 43b connecting the two linear sections 42a and 42b, the lengths La and Lb are set so that:

La>nLb (n: 3 to 5)
10Lb>La>4Lb.

Further, end bent sections 44a and 44b respectively connected to the linear sections 42a and 42b and bent in a direction where the incline angles with respect to the aligning treatment directions 1a and 2a increase with respect to the linear sections 42a and 42b are respectively formed at the ends of the side opposite the end where the two linear sections 42a and 42b of the plurality of bent electrodes 41 of the pixel electrode 4 adjacent to each other. Then, the connecting sections of these end bent sections 44a and 44b and the linear sections 42a and 42b are each formed into a circular arc where one side border and the other side border smoothly connect.

Given an incline angle θc of the end bent sections 44a and 44b respectively formed at the ends of the two linear sections 42a and 42b with respect to the aligning treatment directions 1a and 2a, θc is set to:

20°<θc<40°

Then, given a length Lc of the end bent sections 44a and 44b, the length Lc with respect to the length La of the linear sections 42a and 42b of the bent electrode section 41 is set to a value such that:

La<nLc (n: 3 to 5)
10Lc>La>4Lc.

That is, the end bent sections 44a and 44b of both ends of the bent electrode 41 are formed at substantially the same incline angle and length as the bent sections 43a and 43b connecting the two linear sections 42a and 42b.

The incline angle θa of the two linear sections 42a and 42b of the plurality of bent electrodes 41 of the pixel electrode 4 with respect to the aligning treatment directions 1a and 2a is preferably set to 5°~15° (10°±5°), more preferably to 8°~12° (10°±2°) Further, the incline angles θb and θc of the bent sections 43a and 43b connecting the two linear sections 42a and 42b and the end bent sections 44a and 44b with respect to the aligning treatment directions 1a and 2a are preferably set to 25°~35° (30°±5°), more preferably to 30°±2°.

Of the plurality of bent electrodes 41 of the pixel electrode 4, the linear section 42b of the side connected to the TFT 6 is formed to a length this is shorter than the linear section 42b of the other bent electrode 41, away from the region corresponding to a source electrode 11 of the TFT 6.

The liquid crystal layer 3 comprises nematic liquid crystal having positive dielectric anisotropy and, in the initial state when an electric field is not generated between the pixel electrode 4 and the opposing electrode 5, the liquid crystal molecule 3a of this liquid crystal layer 3 is aligned substantially parallel with the surfaces of the substrates 1 and 2, with its long axis in the aligning treatment directions 1a and 2a.

Figure 5:
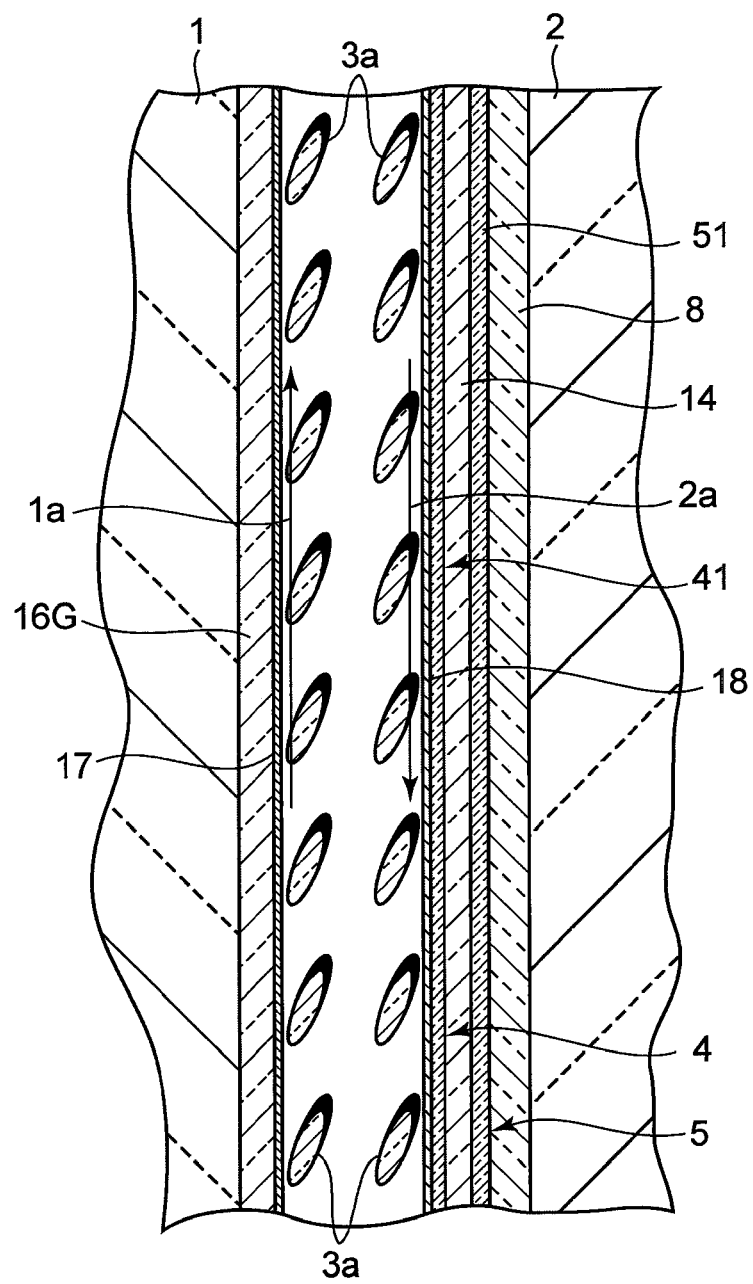
FIG. 5 is an enlarged cross-sectional view showing an enlarged cross-section of the liquid crystal display device shown in FIG. 1 cut along line V-V of FIG. 3.

FIG. 5 shows an enlarged view of a cross-section cut along line V-V of FIG. 3. The liquid crystal molecule 3a, as shown in FIG. 3 and FIG. 5, is aligned with its long axis in alignment with the aligning treatment directions 1a and 2a. The liquid crystal molecule 3a is aligned with the liquid crystal molecule end that is on the side toward the aligning treatment directions 1a and 2a formed on the respective inner surface of each substrate pretilted away from the respective substrate. That is, the liquid crystal molecule 3a is aligned substantially parallel to the surfaces of the substrates 1 and 2.

Further, a transparent anti-static conductive film 21 of a single film shape for blocking static electricity from outside is provided between the front substrate 1 and a front side polarizing plate 19 arranged on the outer surface thereof, across the entire surface of the front substrate 1.

This liquid crystal display device generates an electric field parallel to the substrates that changes the orientation of the long axis of the liquid crystal molecule 3a between the plurality bent electrodes 41 of the pixel electrode 4 and the opposing electrode 5 to substantially parallel with the surfaces of the substrate 1 and 2 by applying drive voltage corresponding to display data between the pixel electrode 4 and the opposing electrode 5 of the plurality of pixels 100. Then, the liquid crystal display device controls on a surface substantially parallel with the surfaces of the substrates 1 and 2 the orientation of the long axis of the liquid crystal molecule 3a of the plurality of pixels 100 by this electric field parallel to the substrates, and displays an image.

The drive voltage applied between the pixel electrode 4 and the opposing electrode 5 is controlled within the range of a minimum value of substantially 0 at which the electric field parallel to the substrates is not generated, to a maximum value at which an electric field parallel to the substrates is generated at an intensity that aligns the liquid crystal molecule 3a of the pixel region where the pixel electrode 4 is arranged so that its long axis is substantially in the direction of 45° with respect to the aligning treatment directions 1a and 2a.

The liquid crystal display device of this example is, for example, a non-electrolytic black display type (hereinafter "normally black type") in which the transparent axis of either the front side polarizing plate 19 or the back side polarizing plate 20 is substantially parallel with or substantially orthogonal to the aligning treatment directions 1a and 2a, and the transparent axis of the other polarizing plate is substantially orthogonal to the one polarizing plate. Then, the display of the pixel 100 turns black in non-electrolytic mode in which an electric field parallel to the substrates is not generated between the pixel electrode 4 and the opposing electrode 5, that is, when the liquid crystal molecule 3a is aligned so that its long axis is in alignment with the aligning treatment directions 1a and 2a, as shown in FIG. 3. Further, the display of the pixel 100 becomes brightest when an electric field parallel to the substrates of an intensity that aligns the liquid crystal molecule 3a so that its long axis is substantially in the direction of 45° with respect to the aligning treatment directions 1a and 2a is generated between the pixel electrode 4 and the opposing electrode 5.

Figure 6:
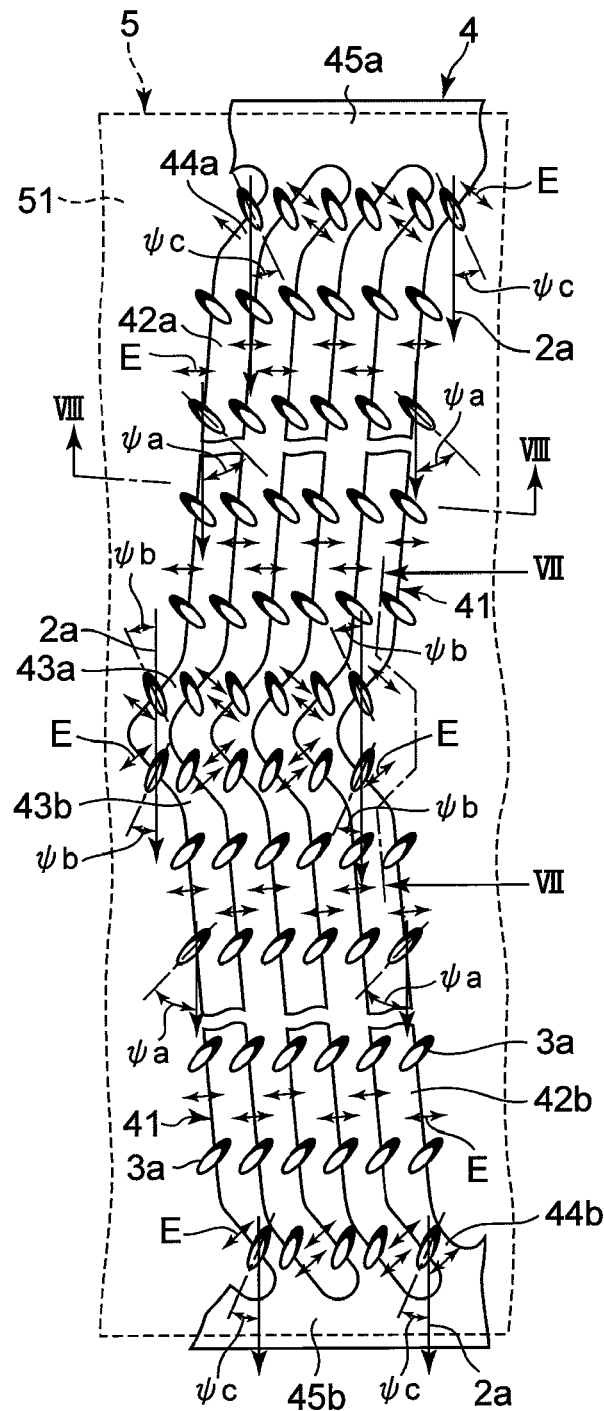
FIG. 6 is a plan view showing the orientation of the liquid crystal molecules of each section within one pixel when an electric field parallel to the substrates is generated between the pixel electrode and opposing electrode.
Figure 7:
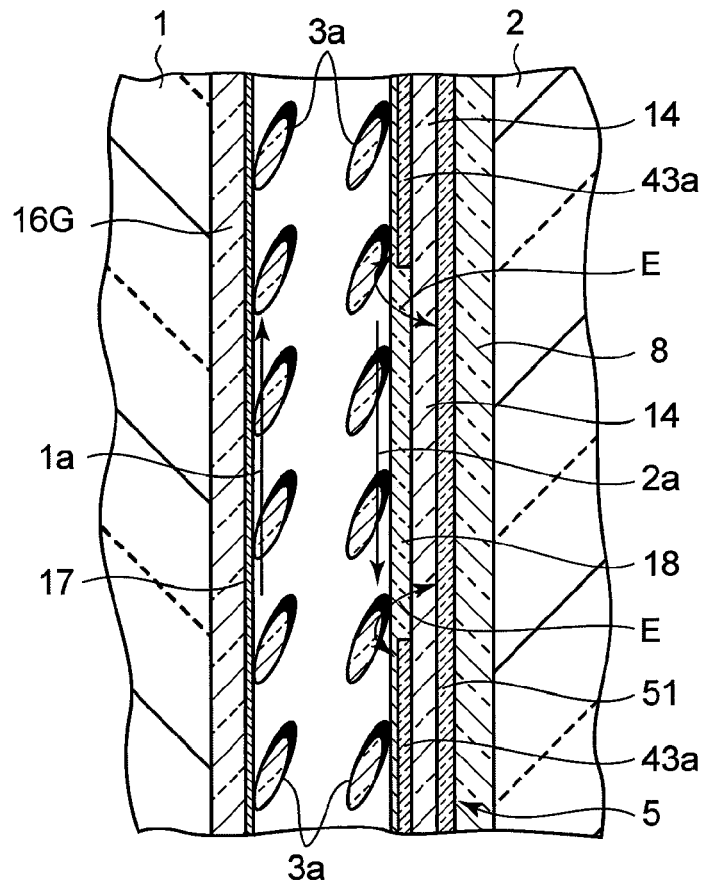
FIG. 7 is an enlarged cross-sectional view showing an enlarged cross-section of the liquid crystal display device shown in FIG. 1 cut along line VII-VII of FIG. 6.
Figure 8:
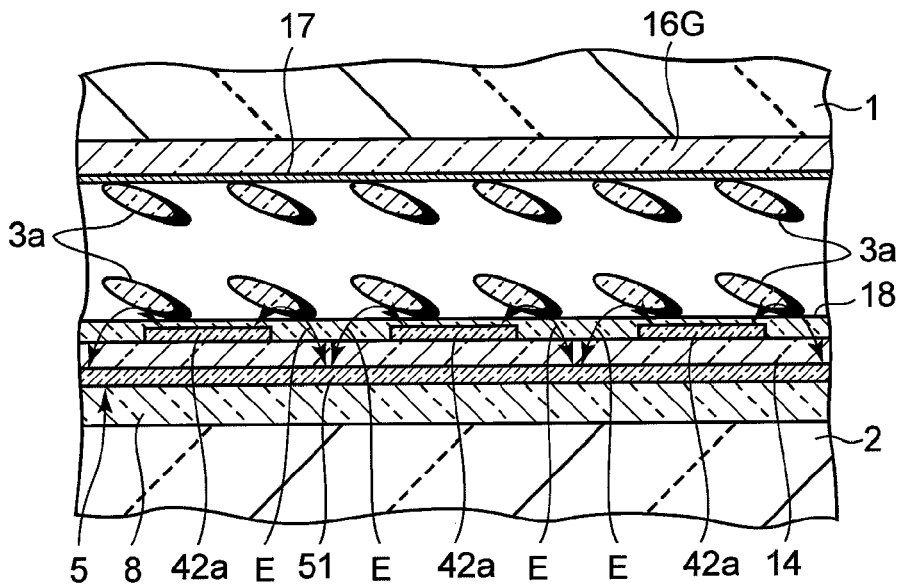
FIG. 8 is an enlarged cross-sectional view showing an enlarged cross-section of the liquid crystal display device shown in FIG. 1 cut along line VIII-VIII of FIG. 6.

FIG. 6 shows the orientation of the long axis of the liquid crystal molecule 3a of each section in a single pixel 100 when an electric field parallel to the substrates of an intensity that aligns the liquid crystal molecule 3a so that its long axis is substantially in the direction of 45° with respect to the aligning treatment directions 1a and 2a is generated between the pixel electrode 4 and the opposing electrode 5. FIG. 7 shows an enlarged view of a cross-section cut along line VII-VII of FIG. 6. FIG. 8 shows an enlarged view of a cross-section cut along line VIII-VIII of FIG. 6.

As shown in FIG. 6 and FIG. 8, a transversal electric field E is generated between the section adjacent to the bent electrode 41 of the opposing electrode 5 and one side border (fringe) and the other side border of the plurality of bent electrodes 41 of the pixel electrode 4.

This transversal electric field E is an electric field of a direction orthogonal to the side border of the plurality of bent electrodes 41 of the pixel electrode 4. The orientation of the liquid crystal molecule 3a is changed by the generation of the transversal electric field E to a direction in which the angle of its long axis with respect to the orientation of the transversal electric field E decreases.

Then, this liquid crystal display device is formed into a shape in which the plurality of bent electrodes 41 of the pixel electrode 4 is substantially bent into a "<" shape, and the two linear sections 42a and 42b respectively intersect the aligning treatment directions 1a and 2a of the inner surfaces of the pair of substrates 1 and 2 at substantially the same angle. As a result, the liquid crystal display device, as shown in FIG. 6, can set different orientations for the transversal electric field E generated between one linear section 42a of the plurality of bent electrodes 41 of the pixel electrode 4 and the opposing electrode 5, and the transversal electric field E generated between the other linear section 42b of the bent electrode 41 and the opposing electrode 5. This enables formation of a region where the liquid crystal molecule 3a is aligned in two different orientations within each pixel 100, thereby achieving a display having a wide view without display view dependability.

Additionally, this liquid crystal display device provides in the section connecting the two linear sections 42a and 42b of the plurality of bent electrodes 41 of the pixel electrode 4 a bent section 43a wherein the side connected to one linear section 42a bends in a direction in which the incline angle with respect to the aligning treatment directions 1a and 2a increases with respect to the one linear section 42a, and a bent section 43b wherein the side connected to the other linear section 42b bends in a direction in which the incline angle with respect to the aligning treatment directions 1a and 2a increases with respect to the other linear section 42b, and is formed into a shape in which these bent sections 43a and 43b connect at a connection section. As a result, even when a strong transversal electric field E that aligns the liquid crystal molecule 3a so that its long axis is substantially at or near the direction of 45° with respect to the aligning treatment directions 1a and 2a is generated between the pixel electrode 4 and the opposing electrode 5, the liquid crystal molecule 3a never tilts at an incline opposite the incline of the pretilt resulting from the aligning treatment.

Figure 9:
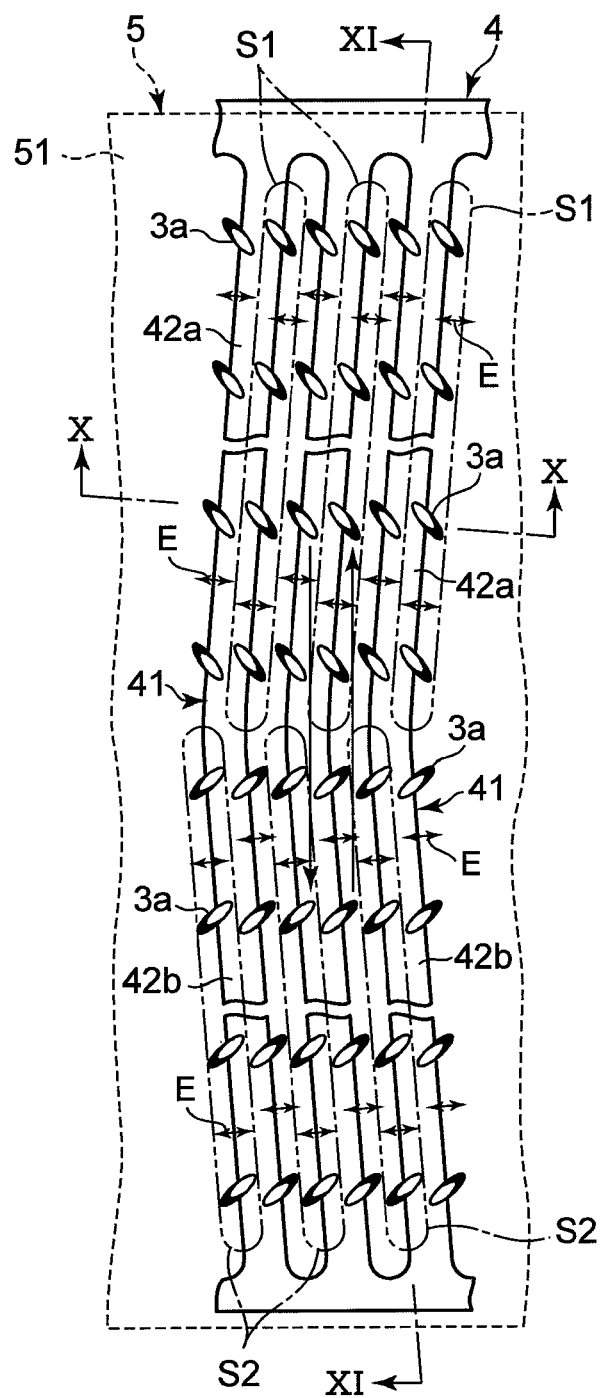
FIG. 9 is a plan view that shows a comparison example where a plurality of bent electrodes of the pixel electrode are formed into a "<" shape where two electrode sections directly connect, and shows the orientation of the liquid crystal molecules of each section within one pixel when an electric field parallel to the substrates is generated between the pixel electrode and opposing electrode.

That is, as shown in the comparative example of FIG. 9, with an electrode of a "<" shape, the transversal electric field E generated between one side border of the bent electrode 41 of the pixel electrode 4 and the opposing electrode 5 and the transversal electric field E generated between the other side border of the other linear section 42b of the bent electrode 41 and the opposing electrode 5 have mutually opposite orientations. Then, the plurality of bent electrodes 41 of the pixel electrode 4 is formed into a shape that bends substantially into a "<" shape with the two linear sections 42a and 42b respectively intersecting at opposite incline angles with respect to the aligning treatment directions 1a and 2a.

The transversal electric field E generated between one side border of one linear section 42a of the bent electrode 41 of the pixel electrode 4 and the opposing electrode 5, and the transversal electric field E generated between the other side border of the other linear section 42b of the bent electrode 41 and the opposing electrode 5 are each an electric field of an orientation that tilts the liquid crystal molecule 3a, which had changed orientation due to the transversal electric field E, to an incline opposite the incline of the pretilt resulting from the aligning treatment of the substrate inner surfaces (hereinafter opposite electric field).

With this arrangement, when a strong transversal electric field E is generated between the pixel electrode 4 and the opposing electrode 5, the force that tilts the liquid crystal molecule 3a as a result of the transversal electric field E acting on the liquid crystal molecule 3a becomes stronger that the force (tilt orientation force of aligning films 17 and 18) that pretilts the liquid crystal molecule 3a as a result of the aligning treatment of the substrate inner surfaces. In consequence, the liquid crystal molecule 3a of the opposite electric field generation region S1 along one side border of one linear section 42a of the bent electrode 41, and the liquid crystal molecule 3a of the opposite electric field generation region S2 along the other side border of the other linear section 42b tilt at an incline opposite the incline of the pretilt resulting from the aligning treatment of the substrate inner surfaces.

That is, when the transversal electric field E is a weak electric field that changes the long axis orientation of the liquid crystal molecule 3a at a small angle with respect to the aligning treatment directions 1a and 2a, the liquid crystal molecule 3a changes in orientation when tilted in the incline direction of the pretilt resulting from the aligning treatment of the substrate inner surfaces, even in the opposite electric field generation area, due to the pretilt orientation force of the substrate inner surfaces. However, when the transversal electric field E is a strong electric field that changes the orientation of the long axis of the liquid crystal molecule 3a at a large angle with respect to the aligning treatment directions 1a and 2a, the force resulting from the electric field parallel to the substrates acts more strongly on the liquid crystal molecule 3a than the pretilt orientation force of the substrate inner surfaces. As a result, the liquid crystal molecule 3a of the opposite electric field generation regions S1 and S2 tilts at an incline opposite the incline of the pretilt resulting from the aligning treatment.

The opposite tilt of the liquid crystal molecule 3a resulting from this transversal electric field E (the tilt of the incline oppose the pretilt incline resulting from the aligning treatment of the substrate inner surfaces) appears from the section corresponding to the bending point of the "V" shape. Then, as the electric field parallel to the substrates E becomes larger, the opposite tilt region increases, becoming longer along the two linear sections 42a and 42b.

Figure 10:
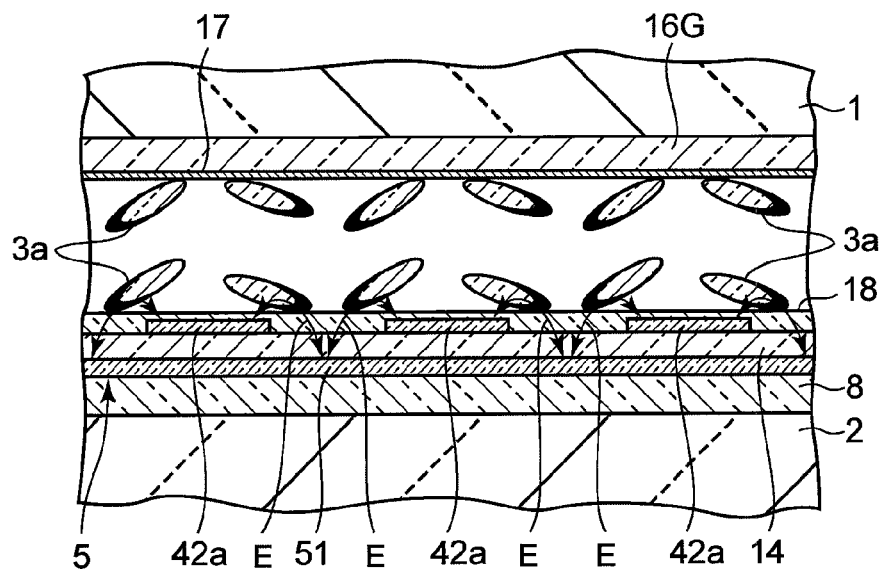
FIG. 10 is an enlarged cross-sectional view showing an enlarged cross-section of the liquid crystal display device shown in FIG. 9 cut along line X-X of FIG. 9.

FIG. 9 shows the orientation of the long axis of the liquid crystal molecule 3a of each section within one pixel 100 when an electric field parallel to the substrates of an intensity that aligns the liquid crystal molecule 3a near the linear sections 42a and 42b of the bent electrode 41 of the pixel electrode 4 so that its long axis is substantially in the direction of 45° with respect to the aligning treatment directions 1a and 2a is generated between the pixel electrode 4 and the opposing electrode 5 in a comparison example wherein the plurality of bent electrodes 41 of the pixel electrode 4 is formed into a "<" shape where the two linear sections 42a and 42b directly connect. FIG. 10 shows a cross-section cut along line X-X of FIG. 9, and FIG. 11 shows a cross-section cut along line XI-XI of FIG. 9.

Figure 11:
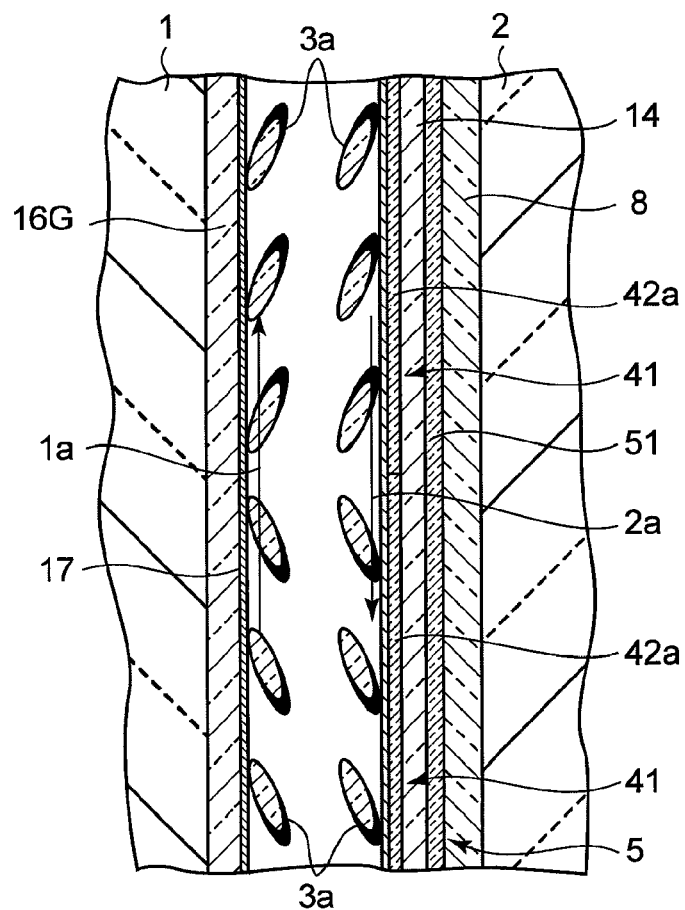
FIG. 11 is an enlarged cross-sectional view showing an enlarged cross-section of the comparison example shown in FIG. 9 cut along line XI-XI of FIG. 9.

As shown in FIG. 9 to FIG. 11, in the comparative example in which the plurality of electrode sections 41 of the pixel electrode 4 is formed into a "<" shape where the two linear sections 42a and 42b directly connect, when a strong electric field parallel to the substrates E is generated between the pixel electrode 4 and the opposing electrode 5, the liquid crystal molecule 3a of the region S1 along the right side border of the linear section 42a of the upper side and the liquid crystal molecule 3a of the region S2 along the left side border of the linear section 42b of the upper side in FIG. 9 tilt at an incline opposite (an incline in the direction away from the back substrate 2 toward the upward left diagonal direction) the incline of the pretilt (the incline in the direction away from the back substrate 2 toward the downward right diagonal direction when viewed from the molecular end side that appears in bold in the figure) resulting from the aligning treatment of the substrate inner surfaces.

As a result, in this comparative example, when a strong electric field E is generated between the pixel electrode 4 and the opposing electrode 5, the regions S1 and S2 where the liquid crystal molecule 3a has been set to an opposite tilt (a tilt of an incline opposite the incline of the pretilt) and another region where an opposite tilt of the liquid crystal molecule 3a does not occur are created. In this comparative example, display non-uniformity occurs due to the difference in the tilt directions of the liquid crystal molecule 3a of these regions.

Contrary to this comparative example, the liquid crystal display device of the above-described example is formed into a shape in which the side connecting the section connecting the two linear sections 42a and 42b of the plurality of bent electrodes 41 of the pixel electrode 4 to one linear section 42a bends in a direction in which the incline angle with respect to the aligning treatment directions 1a and 2a increases with respect to the one linear section 42a. Further, the liquid crystal display device is formed so that the side connecting to the other linear section 42b bends in a direction in which the incline angle with respect to the aligning treatment directions 1a and 2a increases with respect to the other linear section 42b. As a result, of the electric fields E parallel to the substrates between the pixel electrode 4 and the opposing electrode 5, the transversal electric field E generated between one side border and the other side border of the bent sections 43a and 43b of the plurality of bent electrodes 41 of the pixel electrode 4 and the opposing electrode 5 (the electric fields in the direction orthogonal to the side borders of the bent sections 43a and 43b) has an intersecting angle with respect to the aligning treatment directions 1a and 2a that is smaller than that of the electric E field parallel to the substrates generated between one side border and the other side border of the linear sections 42a and 42b of the bent electrode 41 and the opposing electrode 5, as shown in FIG. 6.

In this manner, the changed angle φb of the long axis orientation with respect to the aligning treatment directions 1a and 2b of the liquid crystal molecule 3a of the regions along one side border and the other side border of the bent sections 43a and 43b resulting from the transversal electric field E is smaller than the changed angle φa of the long axis orientation with respect to the aligning treatment directions 1a and 2a of the liquid crystal molecule 3a of the regions along one side border and the other side border of the linear sections 42a and 42b. For this reason, the orientation restraining force of the alignment film and the neighboring intermolecular force aligned by this orientation restraining force act on the liquid crystal molecule 3a of the regions along one side border and the other side border of the bent sections 43a and 43b more intensely than the force resulting from the transversal electric field E. As a result, any change in the tilt angle of the liquid crystal molecule resulting from the transversal electric field E is suppressed.

Further, because the discontinuity of the orientation of the liquid crystal molecule 3a of the region corresponding to the linear section 42b of the bottom side with the linear section 42a of the upper side decreases in the figure of the bent electrode 41 since the bent sections 43a and 43b are connected by a continuous curve, the change in the tilt angle of the liquid crystal molecule is suppressed.

As a result, even when a strong transversal electric field E that aligns the liquid crystal molecule 3a of the regions along the linear sections 42a and 42b of the bent electrode 41 of the pixel electrode 4 so that its long axis is substantially at or near the direction of 45° with respect to the aligning treatment directions 1a and 2a is generated between the pixel electrode 4 and the opposing electrode 5, the long axis orientation is changed in a state where the liquid crystal molecule is tilted in the incline direction of the pretilt resulting from the aligning treatment, without the tilt of the liquid crystal molecule near the bent section reversing.

In consequence, a starting point for reversing the tilt of the liquid crystal molecule 3a of the regions along one side border and the other side border of the linear sections 42a and 42b of the bent electrode 41 never occurs in the section corresponding to the bending point of the bent electrode 41 of a "<" shape, as in the comparative example shown in FIG. 9 to FIG. 11.

Then, the connecting sections of the two bent sections 43a and 43b, which connect the two linear sections 42a and 42b, and the linear sections 42a and 42b are each formed into a circular arc shape where one side border and the other side border smoothly connect. For this reason, the liquid crystal molecule 3a of the respective regions corresponding to the linear sections 42a and 42b achieves a substantially continuous aligned state in the bent sections 43a and 43b.

In this manner, even when a strong transversal electric field E that aligns the liquid crystal molecule 3a of the regions along the linear sections 42a and 42b of the bent electrode 41 of the pixel electrode 4 so that its long axis is substantially at or near the direction of 45° with respect to the aligning treatment directions 1a and 2a is generated between the pixel electrode 4 and the opposing electrode 5, as shown in FIG. 6 to FIG. 8, the liquid crystal display device achieves good display quality without orientation non-uniformity in the regions corresponding to the plurality of bent electrodes 41 of the pixel electrode 4.

Furthermore, in this liquid crystal display device, end bent sections 44a and 44b respectively connected to the linear sections 42a and 42b and bent in a direction in which the incline angle with respect to the aligning treatment directions 1a and 2a increases with respect to the linear sections 42a and 42b are formed at the respective ends of the two linear sections 42a and 42b of the plurality of bent electrodes 41 of the pixel electrode 4. As a result, a transversal electric field E of an orientation having a smaller intersecting angle with respect to the aligning treatment directions 1a and 2a than the transversal electric field E generated between one side border and the other side border of the linear sections 42a and 42b of the bent electrode 41 and the opposing electrode 5 is generated between one side border of the end bent sections 44a and 44b and the opposing electrode 5 as well.

That is, a changed angle $\phi c$ of the long axis orientation with respect to the aligning treatment directions 1a and 2a of the liquid crystal molecule 3a of the regions along one side border and the other side border of the end bent sections 44a and 44b resulting from the transversal electric field E is smaller than the changed angle $\phi a$ of the long axis orientation with respect to the aligning treatment directions 1a and 2a of the liquid crystal molecule 3a of the regions along one side border and the other side border of the linear sections 42a and 42b. With such an arrangement, an opposite tilt resulting from the transversal electric field E never occurs with the liquid crystal molecule 3a of either region along one side border or the other side border of the end bent sections 44a and 44b, thereby enabling the liquid crystal display device to change the long axis orientation at the incline of the pretilt resulting from the aligning treatment. Thus, the liquid crystal display device more effectively eliminates the opposite tilt of the liquid crystal molecule 3a resulting from the transversal electric field E.

Then, given an incline angle $\theta a$ of the two linear sections 42a and 42b of the plurality of bent electrodes 41 of the pixel electrode 4 with respect to the aligning treatment directions 1a and 2a, and an incline angle $\theta b$ of the two bent sections 43a and 43b connecting the two linear sections with respect to the aligning treatment directions 1a and 2a, this liquid crystal display device defines $\theta a$ and $\theta b$ as follows:

$0°<\theta a<20°$
$20°<\theta b<40°$

As a result, the liquid crystal display device eliminates more thoroughly the opposite tilt of the liquid crystal molecule 3a resulting from the transversal electric field E.

Further, given a length La of the two linear sections 42a and 42b of the plurality of bent electrodes 41 of the pixel electrode 4, and a length Lb of the two bent sections 43a and 43b connecting the two linear sections 42a and 42b, this liquid crystal display device defines La and Lb as follows:

La>nLb (n: 3 to 5)
10Lb>La>4Lb.

As a result, the liquid crystal display device amply exhibits an opposite tilt prevention effect on the liquid crystal molecule 3a resulting from the bent section, and substantially diminishes the effect on the display of the region corresponding to the bent section.

Furthermore, this liquid crystal display device defines the incline angle $\theta c$ of the end bent sections 44a and 44b respectively formed at the ends of the two linear sections 42a and 42b of the plurality of bent electrodes 41 of the pixel electrode 4 with respect to the aligning treatment directions 1a and 2a as:

$20°<\theta c<40°$

As a result, this liquid crystal display device eliminates more thoroughly the opposite tilt of the liquid crystal molecule 3a resulting from the transversal electric field E.

Further, this liquid crystal display device defines the length Lc of the end bent sections 44a and 44b with respect to the length La of the linear sections 42a and 42b of the bent electrode 41 as a value such that:

La>nLc (n: 3 to 5)
10Lc>La>4Lc.

As a result, the liquid crystal display device amply exhibits an opposite tilt prevention effect on the liquid crystal molecule 3a resulting from the end bent sections 44a and 44b and substantially diminishes the effect on the display of the region corresponding to the end bent sections 44a and 44b.

In this liquid crystal display device, the incline angle $\theta a$ of the two linear sections 42a and 42b of the plurality of bent electrodes 41 of the pixel electrode 4 with respect to the aligning treatment directions 1a and 2a is preferably set to 5°~15° (10°±5°) more preferably to 10°±2°. Further, the incline angles $\theta b$ and $\theta c$ of the bent sections 43a and 43b, which connect the two linear sections 42a and 42b, and of the end bent sections 44a and 44b with respect to the aligning treatment directions 1a and 2a are preferably set to 25°~35° (30°±5°), more preferably to 28°~32° (30°±2°). In this manner, the liquid crystal display device eliminates more thoroughly the opposite tilt of the liquid crystal molecule 3a resulting from the transversal electric field E.

While the plurality of bent electrodes 41 of the pixel electrode 4 is commonly connected at both respective ends in the above-described example, the plurality of bent electrodes 41 may be commonly connected at one end (the end on the side connected to the TFT 6).

Further, while the opposing electrode 5 is formed in a shape corresponding to the entire area of the pixel 100 in the above-described example, the opposing electrode 5 may correspond to at least the area between the plurality of bent electrodes 41 and 41 of the pixel electrode 4.

Furthermore, for the first and second electrodes provided in mutual isolation on the inner surface of the back substrate 2, the liquid crystal display device of the above-described example employs a plurality of pixel electrodes 4 aligned in a matrix shape as the first electrode on the side of the liquid crystal layer 3, and the opposing electrode 5 as the second electrode farther toward the side of the back substrate 2. However, the liquid crystal display device may conversely employ an opposing electrode as the first electrode on the side of the liquid crystal layer 3, and a plurality of pixel electrodes formed into a matrix shape as the second electrode farther toward the side of the back substrate 2. In this case, the liquid crystal display device may form a plurality of bent electrodes on the opposing electrode, and form the pixel electrode into a shape that corresponds to the entire pixel area or that corresponds to the area between the plurality of bent electrodes of the opposing electrode.

Further, while the first and second electrodes are provided on the inner surface of the back substrate 2 in the above-described example, the first and second electrodes may be provided on the inner surface of the front substrate 1.

As described above, the liquid crystal display device of the present invention comprises a pair of substrates arranged opposite each other at a predetermined gap having been subjected to an aligning treatment in mutually parallel directions on each of the mutually opposed inner surfaces; a liquid crystal layer interposed in the gap between the pair of substrates with long axes of liquid crystal molecules aligned in the direction of the aligning treatment; a plurality of first electrodes that are provided on a first one of the mutually opposed inner surfaces of the pair of substrates for arranging a plurality of pixels in a matrix shape in a row direction and a column direction and thus forming a display region; plurality of thin film transistors that are provided in the aligning-treated surface of the first substrate, each of the plurality of thin film transistors having a source electrode, a drain electrode and a semiconductor film, wherein the source electrode is connected to a corresponding one of the plurality of first electrodes; a plurality of signal lines that are arranged in the column direction, wherein the plurality of signal lines are connected to the drain electrodes of the plurality of thin film transistors; and a plurality of second electrodes that are disposed closer to the first substrate than the plurality of first electrodes, and that generate a transversal electric field for changing the orientations of the long axes of the liquid crystal molecules within a plane substantially parallel to the surfaces of the substrates; wherein each of the plurality of second electrodes has a plurality of opposing sections that are formed so as to overlap with first electrodes among the plurality of first electrodes in a plan view in respective regions opposing to the first electrodes, and a common connection section that connects the plurality of opposing sections, wherein the plurality of second electrodes are provided corresponding to a plurality of rows of the plurality of pixels over an entire length of a row, wherein the plurality of first electrodes comprise a plurality of transparent conductive films respectively corresponding to the plurality of pixels, wherein a plurality of slits are provided in each transparent conductive film along the row direction, wherein each of the plurality of slits has: first and second linear sections, the first linear section extending in a first direction that crosses the directions of the aligning treatment at a first crossing angle, and the second linear section extending in a second direction that crosses the directions of the aligning treatment at a second crossing angle, wherein the first crossing angle is different from the second crossing angle; a first bent section that extends in a third direction that crosses the directions of the aligning treatment at a third crossing angle larger than the first crossing angle, wherein the first bent section is continuous to a first end of the first linear section; a second bent section that extends in a fourth direction that crosses the directions of the aligning treatment at a fourth crossing angle larger than the second crossing angle, wherein the second bent section is continuous to a first end of the second linear section, and the first end of the first linear section and the first end of the second linear section are adjacent to each other; and a connection section that connects the first and second bent sections, wherein for each of the plurality of thin film transistors, given a length A1 of the semiconductor film of the thin film transistor in the directions of the aligning treatment and a length A2 of the source electrode of the thin film transistor in the directions of the aligning treatment, A1 is larger than A2, wherein each of the opposing sections has first and second notches so as not to overlap with a region corresponding to a corresponding thin film transistor, and given a length B1 of the first notch corresponding to the semiconductor film in the directions of the aligning treatment and a length B2 of the second notch corresponding to the source electrode in the directions of the aligning treatment, B1 is larger than B2, and wherein for each of the plurality of first electrodes: (i) slits on a side closer to a corresponding signal line among the plurality of slits of the first electrode are provided with lengths shorter than lengths of the other slits so as not to overlap with the region corresponding to the corresponding thin film transistor, and (ii) a slit adjacent to a corresponding source electrode in the directions of the aligning treatment among the slits on the side closer to the corresponding signal line extends to a bump formed at a corresponding opposing section by the first and second notches, the slit being provided with a length longer than a length of a slit adjacent to a corresponding semiconductor film in the directions of the aligning treatment.

In this liquid crystal display device, the first electrode preferably comprises a plurality of linear sections long and narrow in shape that are formed in parallel at a distance from each other, and connects to each pixel on at least one end of the linear section. Further, preferably a plurality of slits for forming the plurality of linear sections is formed on a transparent conductive film having an area corresponding to a predetermined region for forming a single pixel, and the first electrode is formed from a transparent conductive film other than the transparent conductive film removed as a result of the plurality of slits. Furthermore, preferably the first electrode forms two regions for aligning the long axes of the liquid crystal molecules in two different orientations, a first orientation and a second orientation, when an electric field is applied between the first electrode and the second electrode, and one linear section of the first electrode is formed in one of these two regions, and the other linear section of the first electrode is formed in the other of the two regions. Then, the side border of the connection section of the first electrode is preferably formed into a continuous curved surface.

Further, in this liquid crystal display device, the second electrode is preferably arranged in isolation from the first electrode, between the first electrode of the one substrate and the one substrate.

Furthermore, in the liquid crystal display device, given an incline angle $\theta a$ of the one linear section and the other linear section of the first electrode with respect to the aligning treatment directions, and an incline angle $\theta b$ of each of the bent sections provided at the ends of two adjacent linear sections with respect to the aligning treatment directions, the incline angle $\theta a$ of the linear section and the incline angle $\theta b$ of the bent section are preferably set to $0°<\theta a<20°$ and $20°<\theta b<40°$. Further, given a length La of one linear section and the other linear section of the first electrode, and a length Lb of the bent section, the two lengths La and Lb are preferably set to La>n Lb (n: 3 to 5) and 10Lb>La>4Lb.

Then, in the liquid crystal display device, preferably the first electrode forms an end bent section that is provided on at least the end of either the one linear section or the other linear section, in connection to the linear section, on the side opposite the side where the ends adjacent to each other, and that bends in a direction in which the incline angle with respect to the aligning treatment directions increases with respect to the linear section. In this case, given an incline angle $\theta c$ of the end bent section with respect to the aligning treatment directions, the incline angle $\theta c$ is preferably set to $20°<\theta c<40°$. Further, given a length La of the linear section and a length Lc of the end bent section, the length Lc of the end bent section is preferably set to La>nLc (n: 3 to 5) and 10Lc>La>4Lc.

Various examples and changes may be made thereunto without departing from the broad spirit and scope of the invention. The above-described example is intended to illustrate the present invention, not to limit the scope of the present invention. The scope of the present invention is shown by the attached claims rather than the example. Various modifications made within the meaning of an equivalent of the claims of the invention and within the claims are to be regarded to be in the scope of the present invention.

This application is based on Japanese Patent Application No. 2006-263223 filed on Sep. 27, 2006 and including specification, claims, drawings and summary. The disclosure of the above Japanese Patent Application is incorporated herein by reference in its entirety.

What is claimed is:

1. A liquid crystal display device comprising a pair of substrates having aligning-treated surfaces that have been subjected to an aligning treatment in directions parallel but opposite to each other, the substrates being arranged so that the respective aligning-treated surfaces are opposed to each other with a liquid crystal layer therebetween;
   wherein, for forming each of a plurality of pixels in a matrix shape in a row direction and a column direction and thus forming a display region, a first electrode, a thin film transistor, a signal line, and a second electrode are provided at a first substrate of the pair of substrates,
   wherein the first electrode has a plurality of slits each of which comprises a plurality of opening regions that are formed so as to be serially continuous, wherein the opening regions extend in directions different from each other and different from the directions of the aligning treatment,
   wherein the thin film transistor has a source electrode, a drain electrode and a semiconductor film, wherein the source electrode is connected to the first electrode,
   wherein the signal line is connected to the drain electrode and is formed in the column direction,
   wherein the second electrode overlaps in a plan view with a region of the plurality of slits via an insulating layer,
   wherein the first electrode comprises a transparent conductive film corresponding to one of the plurality of pixels, and wherein the plurality of slits are arranged on the transparent conductive film along the row direction,
   wherein each of the plurality of slits has:
      first and second linear sections, the first linear section extending in a first direction that crosses the directions of the aligning treatment at a first crossing angle, and the second linear section extending in a second direction that crosses the directions of the aligning treatment at a second crossing angle, wherein the first crossing angle is different from the second crossing angle;
      a first bent section that extends in a third direction that crosses the directions of the aligning treatment at a third crossing angle larger than the first crossing angle, wherein the first bent section is continuous to a first end of the first linear section;
      a second bent section that extends in a fourth direction that crosses the directions of the aligning treatment at a fourth crossing angle larger than the second crossing angle, wherein the second bent section is continuous to a first end of the second linear section, and wherein the first end of the first linear section and the first end of the second linear section are adjacent to each other; and
      a connection section that connects the first and second bent sections,
   wherein given a length A1 of the semiconductor film of the thin film transistor in the directions of the aligning treatment and a length A2 of the source electrode of the thin film transistor in the directions of the aligning treatment, A1 is larger than A2,
   wherein the second electrode has first and second notches so as not to overlap with a region corresponding to the thin film transistor, and given a length B1 of the first notch corresponding to the semiconductor film in the directions of the aligning treatment and a length B2 of the second notch corresponding to the source electrode in the directions of the aligning treatment, B1 is larger than B2,
   wherein slits on a side closer to the signal line among the plurality of slits of the first electrode are provided with lengths shorter than lengths of the other slits so as not to overlap with the region corresponding to the thin film transistor, and
   wherein a slit adjacent to the source electrode in the directions of the aligning treatment among the slits on the side closer to the signal line extends to a bump formed in the second electrode by the first and second notches, the slit being provided with a length longer than a length of a slit adjacent to the semiconductor film in the directions of the aligning treatment.

2. The liquid crystal display device according to claim 1, wherein outside dimensions of the first electrode are larger than outside dimensions of the second electrode.

3. The liquid crystal display device according to claim 1, wherein the transparent conductive film of the first electrode surrounds the plurality of slits.

4. The liquid crystal display device according to claim 1, wherein a side edge of the connection section of each of the plurality of slits has an arc shape.

5. The liquid crystal display device according to claim 1, wherein the liquid crystal layer is aligned so that long axes of liquid crystal molecules become parallel with the aligning-treated surfaces of the substrates.

6. The liquid crystal display device according to claim 1, wherein the liquid crystal layer comprises liquid crystal molecules having positive dielectric anisotropy.

7. The liquid crystal display device according to claim 1, wherein the first electrode is positioned closer to the liquid crystal layer than the second electrode.

8. The liquid crystal display device according to claim 1, wherein the first substrate further comprises a scan line which extends in the row direction.

9. The liquid crystal display device according to claim 8, wherein the first electrode is a pixel electrode connected to the signal line and the scan line via the thin film transistor, and the second electrode is a common electrode which is set to an equal potential between display pixels.

10. A liquid crystal display device comprising:
   a pair of substrates having aligning-treated surfaces that have been subjected to an aligning treatment in directions parallel but opposite to each other, the pair of substrates being arranged so that the respective aligning-treated surfaces are opposed to each other with a predetermined gap therebetween;
   a liquid crystal layer which is sealed in the gap between the pair of substrates and in which liquid crystal molecules are aligned substantially parallel to surfaces of the pair of substrates such that orientations of long axes of the liquid crystal molecules are aligned in the directions of the aligning treatment;
   a plurality of first electrodes that are provided in an aligning-treated surface of a first substrate among the aligning-treated surfaces of the pair of substrates for arranging a plurality of pixels in a matrix shape in a row direction and a column direction and thus forming a display region;

a plurality of thin film transistors that are provided in the aligning-treated surface of the first substrate, each of the plurality of thin film transistors having a source electrode, a drain electrode and a semiconductor film, wherein the source electrode is connected to a corresponding one of the plurality of first electrodes;

a plurality of signal lines that are arranged in the column direction, wherein the plurality of signal lines are connected to the drain electrodes of the plurality of thin film transistors; and a plurality of second electrodes that are disposed closer to the first substrate than the plurality of first electrodes so as to be insulated from the plurality of first electrodes, wherein the plurality of second electrodes generate a transversal electric field between the plurality of second electrodes and the plurality of first electrodes for changing the orientations of the long axes of the liquid crystal molecules within a plane substantially parallel to the surfaces of the pair of substrates;

wherein each of the plurality of second electrodes has a plurality of opposing sections that are formed so as to overlap with first electrodes among the plurality of first electrodes in a plan view in respective regions opposing to the first electrodes, and a common connection section that connects the plurality of opposing sections, wherein the plurality of second electrodes are provided corresponding to a plurality of rows of the plurality of pixels over an entire length of a row, wherein the plurality of first electrodes comprise a plurality of transparent conductive films respectively corresponding to the plurality of pixels, wherein a plurality of slits are provided in each transparent conductive film along the row direction, wherein each of the plurality of slits has:
first and second linear sections, the first linear section extending in a first direction that crosses the directions of the aligning treatment at a first crossing angle, and the second linear section extending in a second direction that crosses the directions of the aligning treatment at a second crossing angle, wherein the first crossing angle is different from the second crossing angle;

a first bent section that extends in a third direction that crosses the directions of the aligning treatment at a third crossing angle larger than the first crossing angle, wherein the first bent section is continuous to a first end of the first linear section;

a second bent section that extends in a fourth direction that crosses the directions of the aligning treatment at a fourth crossing angle larger than the second crossing angle, wherein the second bent section is continuous to a first end of the second linear section, and the first end of the first linear section and the first end of the second linear section are adjacent to each other; and a connection section that connects the first and second bent sections, wherein for each of the plurality of thin film transistors, given a length A1 of the semiconductor film of the thin film transistor in the directions of the aligning treatment and a length A2 of the source electrode of the thin film transistor in the directions of the aligning treatment, A1 is larger than A2, wherein each of the opposing sections has first and second notches so as not to overlap with a region corresponding to a corresponding thin film transistor, and given a length B1 of the first notch corresponding to the semiconductor film in the directions of the aligning treatment and a length B2 of the second notch corresponding to the source electrode in the directions of the aligning treatment, B1 is larger than B2, and wherein for each of the plurality of first electrodes: (i) slits on a side closer to a corresponding signal line among the plurality of slits of the first electrode are provided with lengths shorter than lengths of the other slits so as not to overlap with the region corresponding to the corresponding thin film transistor, and (ii) a slit adjacent to a corresponding source electrode in the directions of the aligning treatment among the slits on the side closer to the corresponding signal line extends to a bump formed at a corresponding opposing section by the first and second notches, the slit being provided with a length longer than a length of a slit adjacent to a corresponding semiconductor film in the directions of the aligning treatment.

11. The liquid crystal display device according to claim 10, wherein a side edge of the connection section of each of the plurality of slits has an arc shape.

12. The liquid crystal display device according to claim 10, wherein each of the plurality of first electrodes forms first and second regions for aligning the orientations of the long axes of the liquid crystal molecules in first and second orientations that differ from each other by applying an electric field between the first electrode and a second electrode, wherein the first linear section is formed in the first region, and the second linear section is formed in the second region.

13. The liquid crystal display device according to claim 10, wherein given an incline angle $\theta a$ of the first and second linear sections with respect to the directions of the aligning treatment and an incline angle $\theta b$ of the first and second bent sections between the first and second linear sections and with respect to the directions of the aligning treatment, the incline angle $\theta a$ of the first and second linear sections and the incline angle $\theta b$ of the first and second bent sections are set to:
$0°<\theta a<20°$; and
$20°<\theta b<40°$.

14. The liquid crystal display device according to claim 13, wherein the incline angle $\theta a$ of the first and second linear sections and the incline angle $\theta b$ of the first and second bent sections are set to:
$\theta a=10°\pm5°$; and
$\theta b=30°\pm5°$.

15. The liquid crystal display device according to claim 10, wherein given a length La of the first and second linear sections and a length Lb of the first and second bent sections, the two lengths La and Lb are set so that $10Lb>La>4Lb$.

16. The liquid crystal display device according to claim 10, wherein given a width D of the first and second linear sections and an interval W between the first and second linear sections of adjacent slits among the plurality of slits, a ratio D:W of the two lengths D and W is set to be equal to or larger than 1:3 and equal to or smaller than 3:1.

17. The liquid crystal display device according to claim 16, wherein the ratio D:W of the two lengths D and W is set to be 1:1.

18. The liquid crystal display device according to claim 10, wherein each of the plurality of slits further has an end bent section that is continuous to at least one of second ends opposite to the first ends of the first and second linear sections, wherein the end bent section extends in a direction that crosses the directions of the aligning treatment at a fifth crossing angle larger than the first or second crossing angles.

19. The liquid crystal display device according to claim 18, wherein given an incline angle $\theta c$ of the end bent section with respect to the directions of the aligning treatment, the incline angle $\theta c$ is set to $20° < \theta c < 40°$.

20. The liquid crystal display device according to claim 19, wherein the incline angle $\theta c$ of the end bent section is set to: $\theta c = 30° \pm 5°$.

21. The liquid crystal display device according to claim 18, wherein given a length La of the first and second linear sections and a length Lc of the end bent section, the length Lc is set so that: $10Lc > La > 4Lc$.

* * * * *